3,315,588
PRESERVATIVE APPLICATOR FOR FORAGE
BALES AND THE LIKE
Donn H. Lorenz, % Lorenz Manufacturing Co.,
Benson, Minn. 56215
Filed Aug. 16, 1965, Ser. No. 479,789
4 Claims. (Cl. 99—235)

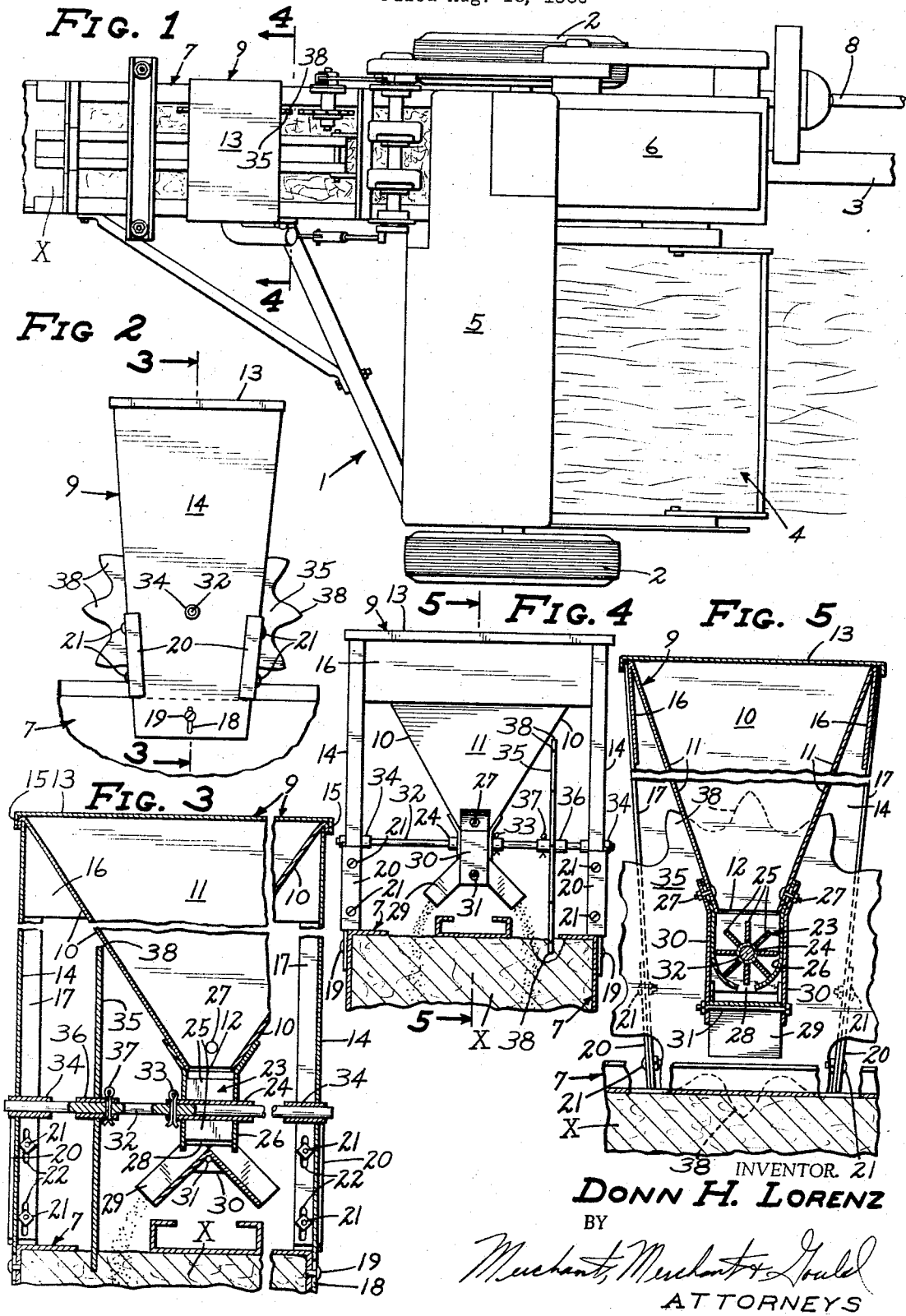
April 25, 1967     D. H. LORENZ     3,315,588
PRESERVATIVE APPLICATOR FOR FORAGE BALES AND THE LIKE
Filed Aug. 16, 1965
INVENTOR.
DONN H. LORENZ
BY
Merchant, Merchant & Gould
ATTORNEYS

United States Patent Office 3,315,588
Patented Apr. 25, 1967

This invention relates generally to agricultural implements, and more particularly to attachments for agricultural implements, for the purpose of applying chemical treatment to crops worked by such implements.

More specifically, this invention is in the nature of a chemical applicator for attachment to forage baling machines, such as hay balers, whereby certain preservative materials may be applied to the forage during the baling thereof, to prevent fermentation of the forage and to promote the retention of the nutritional elements in the baled forage for extended periods of time.

An important object of this invention is the provision of a chemical preservative applicator which will dispense only the quantity of preservative material required for a given amount of forage to be treated.

Another object of this invention is the provision of a chemical preservative applicator which is responsive only to movement of forage through the baling machine to dispense preservative material to the forage.

Another object of this invention is the provision of a chemical preservative applicator which can be quickly and easily mounted on any of the presently known baling machines of the rectanguar bale-forming variety without modification of the baling machines.

Still another object of this invention is the provision of a chemical preservative applicator which is smple and inexpensive to produce, which is highly efficient in operation, and which is rugged in construction and durable in use.

To the above ends, I provide a preservative applicator comprising, a dispensing hopper having means for mounting the same above the bale case or baling chamber of a conventional baling machine and which is provided with a rotary dispensing element for dispensing measured quantities of the preservative material to the forage. The applicator further includes a rotary actuator operatively connected to the dispensing element for imparting rotation thereto, a portion of the actuator being disposed in the path of travel of forage moving through the bale case of the baling machine, movement of the forage imparting rotary movement to said actuator.

The above, and still further highly important objects and advantages of this invention will become apparent through the following detailed specification, appended claims and attached drawings.

Referring to the drawings, which illustrate the invention, and in which like reference characters indicate like parts throughout the several views:

FIG. 1 is a view in top plan of a baling machine and the preservative material applicator of this invention mounted thereon;

FIG. 2 is a fragmentary view in side elevation of the bale case portion of the baling machine and the applicator;

FIG. 3 is an enlarged fragmentary transverse section taken substantially on the line 3—3 of FIG. 2; some parts being broken away;

FIG. 4 is a fragmentary view, partly in end elevation and partly in section, taken substantially on the line 4—4 of FIG. 1; and FIG. 5 is an enlarged fragmentary section taken substantially on the line 5—5 of FIG. 4, some parts being broken away.

Referring with greater detail to the drawings, the numeral 1 indicates, in its entirety, a conventional baling machine mounted on tire-equipped wheels 2, to be drawn by a tractor or the like, not shown, but by means of a draw-bar 3. The baling machine 1 is more or less diagrammatically shown as comprising a pickup and inlet feed portion 4, a cross feed mechanism housing 5, a housing 6 for bale-compressing means, not shown, and a rearwardly extending bale case 7. The baling machine 1 further involves means, not shown, for tying baling wire around the bales as they are formed in the bale case 7, the mechanism of the baling machine 1 being preferably driven from a conventional power take-off mechanism of the tractor, not shown, by means of a drive shaft 8. In view of the fact that rectangular bale-forming baling machines of this type are well-known, and in further view of the fact that, in and of itself, the baling machine does not comprise the instant invention, further detailed showing and description thereof is believed unnecessary. Hence, for the sake of brevity such further showing and description is omitted. It should suffice to state that the baled forage such as hay, indicated by the reference character X, moves through the bale case 7 in a direction from the right to the left with respect to FIG. 1 rearwardly of the machine.

In the baling of forage crops, such as hay, it is usually advisable and often necessary to add salt and/or other chemicals to the bales to preserve the nutritional value of the baled material, and to prevent fermentation thereof during storage. The preservative applicator of this invention is adapted to dispense preservative material to the forage as it passes through the bale case 7 of the baling machine 1 just prior to the tightening of baling wire around the bales, so that the preservative material has opportunity to penetrate to the innermost parts of a bale prior to discharge thereof from the baling machine. The applicator of this invention involves a hopper 9 comprising a pair of downwardly converging side walls 10 and downwardly converging front and rear end walls 11 which cooperate with the side walls 10 to define a discharge opening 12. The upper end of the hopper 9 is normally closed by a removable lid 13. Means for supporting the hopper 9 in overlying spaced relationship to the bale case 7 of the baler 1 comprises a pair of generally vertically disposed plate-like members 14 that are welded or otherwise rigidly secured at their upper ends to depending flanges 15 on the upper ends of the hopper side walls 10, see FIG. 3. The front and rear hopper end walls 11 are formed at their upper ends to provide downwardly projecting flanges 16 that are welded or otherwise secured to opposed inturned flanges 17 of the plate-like mounting members 14. The flanges 17 terminate at their lower ends above the lower ends of their respective mounting plates 14, said lower ends of the mounting members 14 being each disposed adjacent a side wall of the bale case 7 and provided with a vertically disposed slot 18 for reception of an anchoring screw or the like 19 that extends into or through the adjacent side wall of the bale case 7, see particularly FIG. 3. Further, each of the mounting members 14 is provided with a pair of vertically adjustable angular stop members 20 provided with nut-equipped screws 21 that extend through cooperating vertically disposed slots 22 in the side flanges 17 of the mounting members 14, the lower ends of the stop members 20 engaging adjacent top surface portions of the bale case 7 to support the hopper 9 in predetermined spaced relation to the bale case 7.

A feeding rotor 23 is disposed immediately below the discharge opening 12 of the hopper 9, and comprises a tubular hub 24 and a plurality of circumferentially spaced radial feeding blades 25, the rotor 23 being disposed in a housing 26 rigidly secured to the lower end of the hopper 25 by nut-equipped bolts or the like 27. The arcuate lower end of the housing 26 defines a feed opening 28 through which preservative material is metered from the hopper 9 by the feeding rotor 23. An inverted V-shaped guide chute 29 underlies the feed opening 28 and divides the flow of material from the hopper 9 to laterally spaced portions of the forage material X as it moves through the bale case 7. The guide chute 29 is supported by a pair of vertically disposed plates 30 that are secured at their upper ends to the lower end portion of the hopper 9 by the bolts 27. A nut-equipped bolt or the like 31 extends through aligned openings in the lower end portions of the plates 30 and supports the guide chute 29 therebetween, see FIGS. 3–5.

A horizontally disposed rotary drive shaft 32 extends transversely of the bale case 7 and through the tubular hub 24 of the feeding rotor 23, being secured thereto for common rotary movement by suitable means such as a cotter pin or the like 33. At its opposite end portions, the shaft 32 is journalled in suitable bearings 34 rigidly mounted on the mounting members 14. Means for imparting rotary movement to the shaft 32 and feeding rotor 23 includes a relatively large diameter rotary actuator in the nature of a toothed wheel 35, the hub 36 of which is mounted on the shaft 32 and secured thereto for common rotation therewith by a cotter pin or the like 37. The circumferentially spaced radially outwardly projecting teeth 38 of the actuator wheel 35 are adapted to move in the path of travel of the forage material or hay X within the bale case 7, whereby to be encased by the forage material X and the actuator wheel 35 and parts associated therewith rotated responsive to movement of the material X through the bale case 7.

The amount of penetration of the actuator wheel teeth 38 into the material X may be adjusted by raising or lowering the hopper 9 relative to the bale case 7. This is accomplished by loosening the nut-equipped screws 21 and raising or lowering the stop members 20 relative to their respective mounting members 14, assuming that the anchoring screws 19 are also loosened. When the hopper 9 is adjusted to the desired elevation, the screws 19 and 21 are again tightened and the hopper 9 is supported as desired.

It is well-known to those familiar with the operation of baling machines that movement of the forage material or hay X through the bale case 7 is not continuous but intermittent. The actuator wheel 35 being driven by the forage material X, also rotates intermittently to impart intermittent rotation to the feeding rotor 23. Thus, only a predetermined amount of preservative material which, for the purpose of the present example may be considered to be powdered or granular material, is delivered to the forage material X as it passes below the chute 29. This arrangement results in the feeding of preservative material to the forage accurately and uniformly, so that each bale, when it is tied, contains only the uniformly distributed amount of preservative material to maintain the bale in the required condition for later consumption.

It will be appreciated that, while the embodiment of the invention shown deals with powdered or granular chemical material, the principle of operating a material dispenser by means of a forage material driven actuator may as easily be applied to dispensers of preservative material in liquid form.

This invention has been thoroughly tested and found to be completely satisfactory for the accomplishment of the objectives set forth; and, while I have shown and described a commercial embodiment of my preservative applicator, it will be understood that the same is capable of modification without departure from the spirit and scope of the invention, as defined in the claims.

What is claimed is:
1. A preservative applicator for forage bales and the like, comprising:
   (a) a hopper having downwardly tapering side and end walls defining a discharge opening at the bottom of the hopper,
   (b) hopper supporting means for mounting said hopper on a forage baling machine in overlying relation to a bale case portion of the baling machine,
   (c) a rotary shaft journalled in said hopper mounting means on a horizontal axis below said discharge opening,
   (d) a rotary dispensing element mounted on said shaft and positioned below said discharge opening to dispense measured quantities of preservative material from said hopper to forage being moved through the bale case portion of said baling machine,
   (e) and a rotary actuator mounted on said shaft for common rotation therewith and having a peripheral portion disposed in the path of travel of forage being moved through said bale case portion of the baling machine, when said hopper is mounted thereon, to be rotated responsive to movement of forage through said bale case portion.

2. The applicator according to claim 1 in which said rotary actuator includes a plurality of circumferentially spaced forage engaging radial teeth.

3. The preservative applicator defined in claim 1 characterized by an inverted V-shaped guide element underlying said dispensing element and operative to divert the flow of material from said dispensing element into a pair of laterally spaced streams to the forage moving thereunder.

4. The preservative applicator defined in claim 1 in which said hopper supporting means comprises a pair of laterally spaced mounting members each engageable with an adjacent side of a baling machine bale case for generally vertical movements relative to the bale case, stop elements mounted on said mounting member for vertical movements relative to said mounting members and engaging adjacent portions of said bale case, and means for releasably locking said stop elements to said mounting members in different positions of said vertical movements.

References Cited by the Examiner

UNITED STATES PATENTS

| | | | |
|---|---|---|---|
| 1,833,028 | 11/1931 | Lindley | 141—162 |
| 2,565,422 | 8/1951 | Edwards | 99—235 |
| 2,628,002 | 2/1953 | Peterson | 99—235 X |
| 2,642,793 | 6/1953 | Heisey | 99—235 |
| 2,691,468 | 10/1954 | Guyer | 99—235 X |
| 2,964,071 | 12/1960 | Buell et al. | 141—162 |

BILLY J. WILHITE, *Primary Examiner.*